US006701053B2

(12) United States Patent
Liu

(10) Patent No.: US 6,701,053 B2
(45) Date of Patent: Mar. 2, 2004

(54) DISPERSION SHIFTED LARGE EFFECTIVE AREA WAVEGUIDE FIBER

(75) Inventor: Yanming Liu, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 10/152,209

(22) Filed: May 20, 2002

(65) Prior Publication Data

US 2002/0141719 A1 Oct. 3, 2002

Related U.S. Application Data

(63) Continuation of application No. 09/704,919, filed on Nov. 2, 2000, now Pat. No. 6,421,491.
(60) Provisional application No. 60/188,915, filed on Mar. 13, 2000, and provisional application No. 60/166,954, filed on Nov. 22, 1999.

(51) Int. Cl.[7] .............................................. G02B 6/22
(52) U.S. Cl. ...................................................... 385/127
(58) Field of Search ................................ 385/123, 124, 385/126, 127

(56) References Cited

U.S. PATENT DOCUMENTS

| | | | |
|---|---|---|---|
| 4,715,679 A | * 12/1987 | Bhagavatula | |
| 5,013,131 A | * 5/1991 | Fotheringham | |
| 5,613,027 A | * 3/1997 | Bhagavatula | 385/123 |
| 5,675,690 A | 10/1997 | Nouchi et al. | 385/127 |
| 5,684,909 A | 11/1997 | Liu | 385/127 |
| 5,721,800 A | 2/1998 | Kato et al. | 385/127 |
| 5,748,824 A | 5/1998 | Smith | 385/124 |
| 5,835,655 A | 11/1998 | Liu et al. | 385/124 |
| 5,852,701 A | 12/1998 | Kato et al. | 385/127 |
| 5,905,838 A | 5/1999 | Judy et al. | 385/123 |
| 6,072,929 A | 6/2000 | Kato et al. | 385/123 |
| 6,212,322 B1 | * 4/2001 | Ma et al. | 385/123 |
| 6,266,467 B1 | * 7/2001 | Kato et al. | 385/123 |
| 6,421,491 B1 | * 7/2002 | Liu | 385/127 |
| 6,434,310 B1 | * 8/2002 | Liu et al. | 385/123 |
| 6,449,416 B1 | * 9/2002 | Lee et al. | 385/127 |
| 6,453,101 B1 | * 9/2002 | Rousseau et al. | 385/123 |

FOREIGN PATENT DOCUMENTS

| | | | |
|---|---|---|---|
| EP | 0 664 464 A1 | 7/1995 | G02B/6/16 |
| EP | 0 724 171 A2 | 7/1996 | G02B/6/16 |
| EP | 0 774 676 A2 | 5/1997 | G02B/6/16 |
| EP | 0 779 524 A2 | 6/1997 | G02B/6/16 |
| EP | 0 789 255 A1 | 8/1997 | G02B/6/16 |
| EP | 1 103 830 | 5/2001 | G02B/6/16 |
| FR | 1 030 199 A1 | 8/2000 | G02B/6/16 |
| JP | 11-119046 A | 4/1999 | |
| JP | WO 99/30194 | 6/1999 | G02B/6/16 |
| WO | WO 98/00739 | 1/1998 | G02B/6/22 |
| WO | WO 00/17681 | 3/2000 | G02B/6/16 |
| WO | WO 00/17682 | 3/2000 | G02B/6/16 |
| WO | WO 00/17683 | 3/2000 | G02B/6/16 |
| WO | WO 00/38356 | 6/2000 | H04B/10/18 |

OTHER PUBLICATIONS

Y. Liu, et al., "Design and Fabrication of Locally Dispersion–Flattened Large Effective Area Fibers", ECOC, Sep. 1998, Madrid, Spain, pp. 37–38.
Peckham et al, "Reduced Dispersion Slope, Non–Zero Dispersion Fiber", ECOC'98, Sep. 20–24, 1998, Madrid, Spain.
Patent Abstracts of Japan, Publication No. 10010350, Kokusai Denshin Denwa Co Ltd, Publication Date: Jan. 16, 1998.

* cited by examiner

*Primary Examiner*—John D. Lee
*Assistant Examiner*—Mike Stahl
(74) *Attorney, Agent, or Firm*—William J Chervenak; Joseph M Homa

(57) ABSTRACT

Disclosed is a dispersion shifted optical waveguide fiber having low but non-zero dispersion over an extended wavelength window that includes wavelengths, from 1470 nm to 1625 nm. Waveguide fiber core refractive index profiles exhibit the desired dispersion performance while maintaining resistance to pin array and lateral load bending at least equivalent to standard waveguide fiber. Attenuation over the operating wavelength range is low and zero dispersion wavelength is typically less than 1450 nm.

18 Claims, 4 Drawing Sheets

DISPERSION SHIFTED LARGE EFFECTIVE AREA WAVEGUIDE FIBER

CROSS-REFERENCE TO RELATED APPLICATIONS

This application is a continuation of U.S. application Ser. No. 09/704,919, filed Nov. 2, 2000, now U.S. Pat. No. 6,421,491, which claims priority to and the benefit of U.S. Provisional Application No. 60/166,954 filed on Nov. 22, 1999, and U.S. Provisional Application No. 60/188,915 filed Mar. 13, 2000, the content of which is relied upon and incorporated herein by reference in its entirety.

BACKGROUND OF THE INVENTION

1. Field of the Invention

The present invention relates generally to a waveguide fiber having large effective area, and particularly to such a fiber designed for use over an extended wavelength range.

2. Technical Background

Dispersion shifted optical waveguide fiber having large effective area, for example that disclosed and described in U.S. Pat. No. 5,835,655, Liu et al., has been developed for use in the wavelength range which spans the low attenuation wavelength window around 1550 nm. The large effective area of the waveguide serves to limit non-linear dispersion effects that can occur in high power or high data rate systems. In U.S. Pat. No. 5,748,824, Smith, is disclosed a dispersion shifted waveguide fiber having its zero dispersion wavelength outside the operating window to limit losses in wavelength division multiplexed systems due to four wave mixing and cross phase modulation. In particular, the zero dispersion wavelength is designed to be less than the lower wavelength of the operating window so that the linear dispersion is non-zero and positive over the operating window. In such a waveguide fiber design, non-linear self phase modulation as well as four wave mixing and cross phase modulation effects are curtailed.

The demand for additional capacity has encouraged a search for waveguide index profile designs that extend the operating window into the L-band, typically defined as the wavelength range 1565 nm to 1625 nm or 1650 nm. A successful design for this extended operating range would exhibit a dispersion magnitude over the entire operating wavelength range sufficient to limit the four wave mixing and cross phase modulation effects, which become larger in systems having relatively smaller channel spacing. Such waveguide fiber designs preferably would not sacrifice performance in the C-band, typically defined as the wavelength range from 1530 nm to 1565 nm. In addition, the total dispersion slope would preferably be low enough to preclude high linear dispersion at the upper end of the wavelength range.

The problem of designing a waveguide fiber having a desired magnitude of total dispersion over at least the S (1470 nm to 1530 nm), C (1530 nm to 1565 nm), and L (1565 nm to 1650 nm) bands is addressed by the present invention. An extended S band defined as the wavelength range from 1350 nm to 1530 nm is also addressed in this application.

Definitions

The following definitions are in accord with common usage in the art.

The refractive index profile is the relationship between refractive index or relative refractive index and waveguide fiber radius.

A segmented core is one that is divided into at least a first and a second waveguide fiber core portion or segment. Each portion or segment is located along a particular radial length, is substantially symmetric about the waveguide fiber centerline, and has an associated refractive index profile.

The radii of the segments of the core are defined in terms of the respective refractive indexes at respective beginning and end points of the segments. The definitions of the radii used herein are set forth in the figures and the discussion thereof.

Total dispersion of a waveguide fiber is the sum of the material dispersion, the waveguide dispersion, and the inter-modal dispersion. In the case of single mode waveguide fibers the inter-modal dispersion is zero.

The sign convention generally applied to the total dispersion is as follows. Total dispersion is said to be positive if shorter wavelength signals travel faster than longer wavelength signals in the waveguide. Conversely, in a negative total dispersion waveguide, signals of longer wavelength travel faster.

The effective area is $A_{\mathit{eff}}=2\pi(\int E^2 r\, dr)^2/(\int E^4 r\, dr)$, where the integration limits are 0 to $\infty$, and E is the electric field associated with light propagated in the waveguide. An effective diameter, $D_{\mathit{eff}}$, may be defined as, $$A_{\mathit{eff}}=\pi(D_{\mathit{eff}}/2)^2.$$

The relative refractive index percent, $\Delta\%=100\times(n_i^2-n_c^2)/2n_i^2$, where $n_i$ is the maximum refractive index in region i, unless otherwise specified, and $n_c$ is the average refractive index of the cladding region.

The term $\alpha$-profile refers to a refractive index profile, expressed in terms of $\Delta(b)\%$, where b is radius, which follows the equation, $\Delta(b)\%=\Delta(b_0)(1-[|b-b_0|/(b_1-b_0)]^\alpha)$, where $b_0$ is the point at which $\Delta(b)\%$ is maximum, $b_1$ is the point at which $\Delta(b)\%$ is zero, and b is in the range $b_i \leq b \leq b_f$, where delta is defined above, $b_i$ is the initial point of the $\alpha$-profile, $b_f$ is the final point of the $\alpha$-profile, and $\alpha$ is an exponent which is a real number.

The pin array bend test is used to compare relative resistance of waveguide fibers to bending. To perform this test, attenuation loss is measured for a waveguide fiber with essentially no induced bending loss. The waveguide fiber is then woven about the pin array and attenuation again measured. The loss induced by bending is the difference between the two attenuation measurements. The pin array is a set of ten cylindrical pins arranged in a single row and held in a fixed vertical position on a flat surface. The pin spacing is 5 mm, center to center. The pin diameter is 0.67 mm. The waveguide fiber is caused to pass on opposite sides of adjacent pins. During testing, the waveguide fiber is placed under a tension just sufficient to make the waveguide conform to a portion of the periphery of the pins. The test pertains to macro-bend resistance of the waveguide fiber.

Another bend test referenced herein is the lateral load test. In this test a prescribed length of waveguide fiber is placed between two flat plates. A #70 wire mesh is attached to one of the plates. (The market code #70 mesh is descriptive of screen made of wire having a diameter of 0.178 mm. The screen openings are squares of side length 0.185 mm.) A known length of waveguide fiber is sandwiched between the plates and a reference attenuation is measured while the plates are pressed together with a force of 30 newtons. A 70 newton force is then applied to the plates and the increase in attenuation in dB per unit length is measured. This increase in attenuation is the lateral load attenuation of the waveguide. The test pertains to the micro-bend resistance of the waveguide fiber.

SUMMARY OF THE INVENTION

A first aspect of the present invention is an optical waveguide fiber, typically a single mode optical waveguide fiber, having a core region surrounded by a clad layer. The core region and the clad layer are characterized by respective refractive index profiles. The core region is divided into a central segment, a first annular segment surrounding the central segment, and a second annular segment surrounding the first annular segment. Each segment has a refractive index profile and an inner and an outer radius. The core segments are configured to provide a waveguide fiber having a positive total dispersion in the range of 1.0 ps/nm-km to 16.0 ps/nm-km over a wavelength range extending from 1470 nm to 1625 nm.

An extension of this aspect (aspect extension) of the invention is one in which the wavelength range of operation is 1450 nm to 1625 nm. The total dispersion (sometimes referred to as chromatic dispersion) is in the range of 0.1 ps/nm-km to 18 ps/nm-km over the range of operation, and the zero dispersion wavelength is less than 1450 nm. In a preferred embodiment of the aspect extension, the total dispersion at 1525 nm is no greater than 11 ps/nm-km.

At 1550 nm the waveguide of this first aspect is characterized by an effective area greater than 60 $\mu m^2$, preferably greater than 70 $m^2$, and an attenuation less than 0.25 dB/km, preferably less than 0.20 dB/km. In the aspect extension the effective area is greater than 70 $\mu m^2$ and preferably greater than 80 $\mu m^2$. The attenuation at 1550 nm of the aspect extension is less than 0.20 dB/km. At 1600 nm the first aspect of the invention has effective area greater than 70 $\mu m^2$, preferably greater than 80 $\mu m^2$, and more preferably greater than 85 $\mu m^2$. At 1600 nm, the aspect extension has an effective area greater than 90 $\mu m^2$ and more preferably greater than 95 $\mu m^2$. The attenuation at 1600 nm is less than 0.25 dB/km, preferably less than 0.22 dB/km, and more preferably less than 0.20 dB/km. The attenuation of the aspect extension at 1600 nm is less than 0.21 dB/km and preferably less than 0.20 dBkm. In addition, the pin array bend loss and lateral load bend loss at 1550 nm of a waveguide made in accordance with this first aspect of the invention are less than 12 dB and less than 1.0 dB/km, respectively. The pin array bend loss at 1600 nm is less than 16 dB. In the aspect extension the pin array bend loss is less than 10 dB and the lateral load bend loss is less than 1.3 dB/km and preferably less than 1.0 dB/km.

An embodiment of the waveguide fiber in accord with the first aspect of the invention has a central segment of relative index percent, $\Delta_0$, $0.50\% \leq \Delta_0 \leq 1.0\%$, inner radius zero, and outer radius $r_0$, $3.5\ \mu m \leq r_0 \leq 5.0\ \mu m$. A first annular segment has relative index percent, $\Delta_1$, $0.01\% \leq \Delta_1 \leq 0.1\%$, and outer radius $r_1$, $5.5\ \mu m \leq r_1 \leq 10\ \mu m$. A second annular segment has relative index percent, $\Delta_2$, $0.15\% \leq \Delta_2 \leq 0.35\%$, center radius $r_{2c}$, $7.0\ \mu m \leq r_{2c} \leq 11.0\ \mu m$, and width $w_2$, $0.8\ \mu m \leq w_2 \leq 2.5\ \mu m$.

An embodiment of the waveguide fiber in accord with the aspect extension has a central segment of triangular shape and relative index percent, $\Delta_0$, $0.50\% \leq \Delta_0 \leq 0.75\%$, inner radius zero, and outer radius $r_0$, $4.0\ \mu m \leq r_0 \leq 5.5\ \mu m$. A first annular segment has relative index percent, $\Delta_1$, $0.01\% \leq \Delta_1 \leq 0.04\%$ and outer radius $r_1$, $6\ \mu m \leq r_1 \leq 8\ \mu m$. A second annular segment has relative index percent, $\Delta_2$, $0.25\% \leq \Delta_2 \leq 0.40\%$, center radius $r_{2c}$, $6.5\ \mu m \leq r_{2c} \leq 9.0\ \mu m$, and width $w_2$, $1.0\ \mu m \leq w_2 \leq 2.5\ \mu m$. This embodiment may have an optional centerline depression having a relative index percent on centerline of about 0.3% and a half relative index radius no greater than about 0.5 $\mu$m. The term half relative index is defined in the detailed description.

In another embodiment, the waveguide fiber in accordance with the first aspect of the invention has an index depression on its centerline. The depression exhibits a minimum relative index of no less than zero and a radius, measured at the minimum index, of no greater than 1 $\mu$m. In this embodiment, the core parameters of the waveguide fiber are such that a central segment has relative index percent, $\Delta_0$, $0.50\% \leq \Delta_0 \leq 1.0\%$ and outer radius $r_0$, $3.0\ \mu m \leq r_0 \leq 5.0\ \mu m$. A first annular segment has relative index percent, $\Delta_1$, $0.01\% \leq \Delta_1 \leq 0.1\%$ and outer radius $r_1$, $6.0\ \mu m \leq r_1 \leq 9\ \mu m$. A second annular segment has relative index percent, $\Delta_2$, $0.15\% \leq \Delta_2 \leq 0.50\%$, center radius $r_{2c}$, $7.0\ \mu m \leq r_{2c} \leq 11.0\ \mu m$, and width $w_2$, $1.0\ \mu m \leq w_2 \leq 3.0\ \mu m$.

In an embodiment of the aspect extension of the invention, the waveguide fiber has an index depression on its centerline. The depression exhibits a minimum relative index in the range of 0.1% to 0.3% and a radius, measured at the minimum index, in the range of 0.5 to 1 $\mu$m. In this embodiment, the core parameters of the waveguide fiber are such that a central segment has relative index percent, $\Delta_0$, $0.55\% \leq \Delta_0 \leq 0.8\%$ and outer radius $r_0$, $3.5\ \mu m \leq r_0 \leq 4.5\ \mu m$. A first annular segment has relative index percent, $\Delta_1$, $0.015\% \leq \Delta_1 \leq 0.35\%$ and outer radius $r_1$, $7\ \mu m \leq r_1 \leq 8\ \mu m$. A second annular segment has relative index percent, $\Delta_2$, $0.30\% \leq \Delta_2 \leq 0.40\%$, center radius $r_2$, $8.0\ \mu m \leq r_{2c} \leq 9.0\ \mu m$, and width $w_2$, $1.0\ \mu m \leq w_2 \leq 2.0\ \mu m$.

The shape of the profile of the respective segments in any of the embodiments set forth herein are selected from the group consisting of a step, a rounded step, a trapezoid, a rounded trapezoid, and an $\alpha$-profile wherein $\alpha$, $0.1 \leq \alpha \leq 50$. The triangular profile is known to be an $\alpha$-profile having $\alpha=1$.

In yet a further embodiment of the waveguide in accordance with the first aspect of the invention, the core region includes a third annular segment having a negative relative index, where, as is stated above, the reference index is taken as the average index of the clad layer. The addition of this third annular segment provides a waveguide fiber having an effective area at 1550 nm greater than 70 $\mu m^2$ and preferably greater than 80 $\mu m^2$, and attenuation at 1550 nm less than 0.25 dB/km and preferably less than 0.20 dB/km. The waveguide fiber made in accordance with this embodiment also has pin array bend loss less than 5 dB at 1550 nm and less than 8 dB at 1600 nm. The lateral load bend loss at 1550 nm is less than 1.38 dB/km and at 1600 nm less than 2.55 dB/km. The effective area at 1600 nm of this embodiment is greater than 90 $\mu m^2$ and preferably greater than 95 $\mu m^2$ and the 1600 nm attenuation is less than 0.25 dB/km and preferably less than 0.22 dB/km.

A waveguide made in accordance with this embodiment has a third annular segment of relative index $\Delta_3$, $-0.15\% \leq \Delta_3 \leq -0.45\%$, center radius $r_{3c}$, $12.0\ \mu m \leq r_{3c} \leq 17.0\ \mu m$, and width $w_3$, $2.5\ \mu m \leq w_3 \leq 5.0\ \mu m$. This embodiment has a central segment of relative index percent, $\Delta_0$, $0.50\% \leq \Delta_0 \leq 1.0\%$ and outer radius $r_0$, $4.0\ \mu m \leq r_0 \leq 6.0\ \mu m$.

The first annular segment has relative index percent, $\Delta_1$, $0.01\% \leq \Delta_1 \leq 0.10\%$, and outer radius $r_1$, $7.5\,\mu\text{m} \leq r_1 \leq 11\,\mu\text{m}$. The second annular segment has relative index percent, $\Delta_2$, $0.35\% \leq \Delta_2 \leq 0.6\%$, and outer radius $r_2$, $10\,\mu\text{m} \leq 15\,\mu\text{m}$.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DETAILED DESCRIPTION OF THE INVENTION

Reference will now be made in detail to the present preferred embodiments of the invention, examples of which are illustrated in the accompanying drawings.

Figure 1:
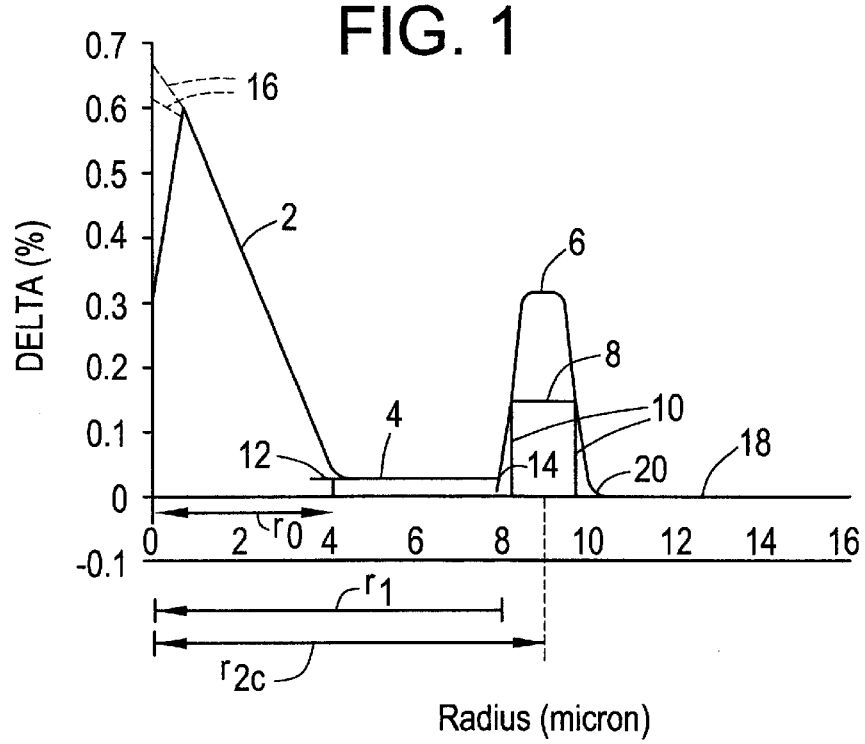
FIG. 1 is a chart of relative refractive index versus radius for a waveguide fiber in accordance with the invention.

An exemplary embodiment of the waveguide fiber refractive index profile of the present invention is shown in FIG. 1. The refractive index profile illustrated in FIG. 1 has a core region that includes central segment 2, first annular segment 4, and, second annular segment 6. The geometrical width of the core is typically defined as the radius drawn from the centerline to point 20 where the refractive index of the final core segment, segment 6 in this case, is equal to that of the clad layer, layer 18 in this case.

The definitions of the segment radii are illustrated in FIG. 1. Central segment 2 has radius $r_0$ measured from the centerline of the profile, i.e., the vertical axis, to the point 12, which is the point where the extrapolation of central segment 2 crosses the extrapolation of first annular segment 4. The inner radius of the central segment is zero. The inner radius of the first annular segment is identical to the outer radius of the central segment. The outer radius of the first annular segment 4 is $r_1$, the radius from the centerline to the extrapolated meeting point 14 of annular segments 4 and 6. The center radius of the second annular 6 segment is $r_{2c}$, the radius drawn from the centerline to the midpoint 14 of the width 8 of the second annular segment. The width 8 is taken as the width of the second annular segment at the half maximum of the relative index percent. This choice of definitions of radii of the core region in no way limits the invention and is intended merely as a means to describe the structural features of the core region. Dashed lines 16 in FIG. 1 indicate alternative shapes of central segment 2 in the portion of the segment near the centerline.

The large effective area provided by the refractive index profile shown in FIG. 1 and by the profiles discussed below limits non-linear effects so that high power laser sources, e.g., those providing a launched power of several milli-watts or more, can be used with limited penalty due to non-linear effects. Furthermore the non-zero dispersion over an extended wavelength range of waveguide fibers made in accordance with FIG. 1, as well as the figures discussed below, provides for very high data rate telecommunications systems. For example, in a wavelength division multiplexed communications system, using the waveguide fiber in accordance with the invention and operating at 10 Gb/s, one would expect dispersion compensation to be needed only at the terminal end of the system rather than at intervals spaced along the system length. A channel spacing of 50 GHz is made possible by use of the waveguide fiber in accordance with invention because the non-zero dispersion over an extended wavelength range (1–16 ps/nm-km over the wavelength range 1470 nm to 1625 nm) is sufficient to limit power penalty due to four wave mixing and cross phase modulation. The waveguide fiber in accordance with the invention can better enable a multiplexed telecommunications system operating at 40 Gb/s.

Figure 2:
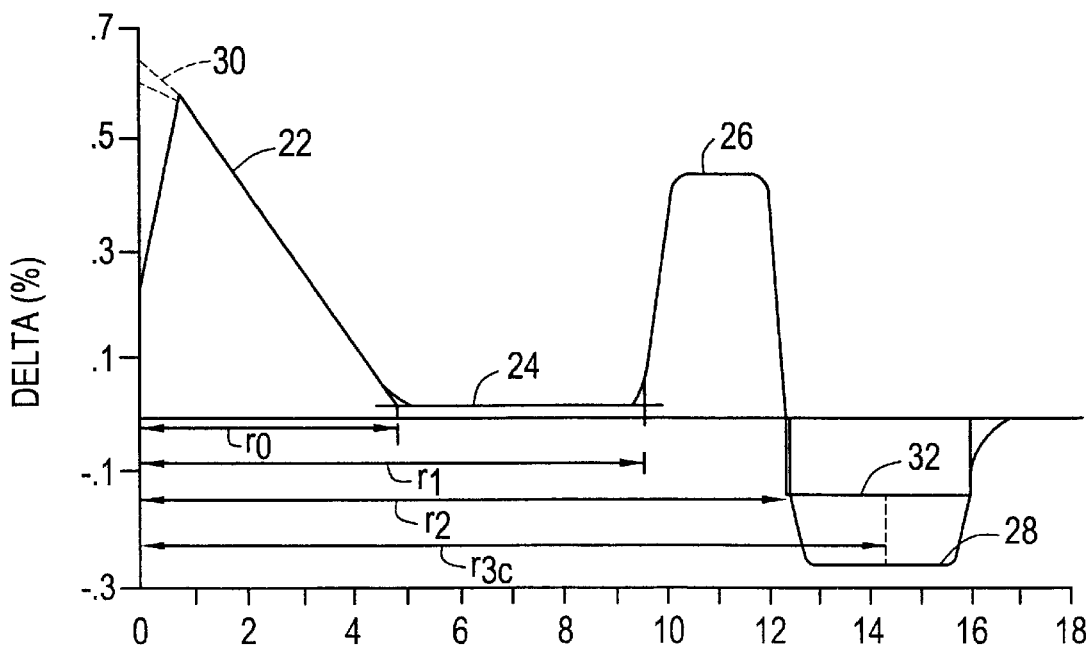
FIG. 2 is a chart of relative refractive index versus radius for a waveguide fiber having a negative annular segment in accordance with the invention.

FIG. 2 shows an embodiment of the invention than includes a third annular region 28 surrounding central region 22, first annular region 24, and second annular region 26. Third annular region 28 has negative relative refractive index percent, which serves to more efficiently guide signal light power propagating in the waveguide. This improved signal power guidance means that the waveguide is less susceptible to losses due to bending as compared to a waveguide index profile that does not include a third annular segment having negative relative index.

EXAMPLE 1

A waveguide fiber in accordance with FIG. 1 was modeled using the parameters, central segment relative index 2, $\Delta_0\% = 0.53\%$, central segment outer radius $r_0 = 4.6\,\mu\text{m}$, first annular segment index 4, $\Delta_1\% = 0.025\%$, first annular segment radius $r_1 = 7.8\,\mu\text{m}$, and second annular segment index 6, $\Delta_2\% = 0.30\%$, center radius $r_{2c} = 9\,\mu\text{m}$, and width $w_2 = 1.56\,\mu\text{m}$. The centerline relative index was taken to be 0.27% minimum and as having a maximum width of 0.5 $\mu$m. An index depression of this small radius does not have appreciable effect on the propagated light power distribution across the core region of the waveguide and can readily be compensated by a small change in relative index of the central segment.

The calculated properties of the exemplary waveguide fiber were, zero dispersion wavelength 1478.8 $\mu$m, total dispersion at 1525 nm, 3.47 ps/nm-km, total dispersion at 1575 nm, 7.23 ps/nm-km, total dispersion slope over the wavelength range 1525 nm to 1575 nm, 0.075 ps/nm²-km, mode filed diameter at 1550, 10.23 $\mu$m, fiber cut off wavelength, 1906 nm, corresponding to a cabled cut off calculated to be 1247 nm, pin array bend loss at 1550 nm, 11.82 dB, lateral load bend loss at 1550 nm, 0.732 dB/km, effective area at 1550 nm, 79.6 $\mu m^2$, and attenuation at 1550 nm, 0.196 dB/km.

The calculation properties in the L band were, total dispersion at 1625 nm, 11.4 ps/nm-km, total dispersion slope over the wavelength range 1575 nm to 1625 nm, 0.075 ps/nm$^2$-km, fiber cut off wavelength, 1834 nm, pin array bend loss at 1600 nm, 15.6 dB, effective area at 1600 nm, 89.5 $\mu m^2$, and mode field diameter at 1600 nm, 10.84 $\mu m$.

The calculated properties at the 1310 nm operating window were, total dispersion at 1285 nm, −13.9, total dispersion at 1335 nm, −10 ps/nm-km, total dispersion slope over the wavelength range 1285 nm to 1335 nm, 0.079 ps/nm$^2$-km, fiber cut off wavelength, 1834 nm, pin array bend loss at 1310 nm, 0.39 dB, effective area at 1310 nm, 48.1 $\mu m^2$ and mode field diameter at 1310 nm, 8.0 $\mu m$.

These properties are within desired limits for the C and L bands and are adequate to provide an operating window that extends to the shorter wavelengths around 1310 nm. Optical waveguide fiber made in accordance with this example will support the high, multiplexed data rates described above.

Comparative Example 2

A waveguide fiber in accordance with FIG. 2 was modeled using the parameters, central segment relative index 22, $\Delta_0\%=0.58\%$, central segment outer radius $r_0=5.0$ $\mu m$, first annular segment index 24, $\Delta_1\%=0.02\%$, first annular segment radius $r_1=9.2$ $\mu m$, second annular segment index 26, $\Delta_2\%$ 0.46%, outer radius $r_2=12.2$ $\mu m$, and third annular segment index 28, $\Delta_3=-0.25\%$, center radius $r_{3c}=14.3$ $\mu m$ and width 32, $w_3=3.45$ $\mu m$. Dashed lines 30 show alternative centerline relative index shapes. The centerline relative index was taken to be 0.23% minimum and as having a maximum width of 0.04 $\mu m$. An index depression of this small radius does not have appreciable effect on the propagated light power distribution across the core region of the waveguide and so can readily be compensated by a small change in relative index of the central segment.

The calculated properties of the exemplary waveguide fiber were, zero dispersion wavelength 1461.5 $\mu m$, total dispersion at 1525 nm, 4.88 ps/nm-km, total dispersion at 1575 nm, 8.72 ps/nm-km, total dispersion slope over the wavelength range 1525 nm to 1575 nm, 0.077 ps/nm$^2$-km, mode filed diameter at 1550, 10.46 $\mu m$, fiber cut off wavelength, 2150 nm, corresponding to a cabled cut off calculated to be 1212 nm, pin array bend loss at 1550 nm, 4.76 dB, lateral load bend loss at 1550 nm, 1.38 dB/km, effective area at 1550 nm, 90.2 m$^2$, and attenuation at 1550 nm, 0.198 dB/km.

The calculation properties in the L band were, total dispersion at 1625 nm, 12.6 ps/nm-km, total dispersion slope over the wavelength range 1575 nm to 1625 nm, 0.079 ps/nm$^2$-km, pin array bend loss at 1600 nm, 7.5 dB, lateral load bend loss at 1600 nm, 2.55 dB/km, effective area at 1600 nm, 101.7 $\mu m^2$, and mode field diameter at 1600 nm, 11.0 $\mu m$.

The improvement in bending resistance and effective area is apparent for the profile design illustrated in FIG. 2 as compared to that of FIG. 1. The difficulty of manufacture is the main consideration when choosing either the index profile of FIG. 1 or FIG. 2 as preferred.

EXAMPLE 3

Figure 3:
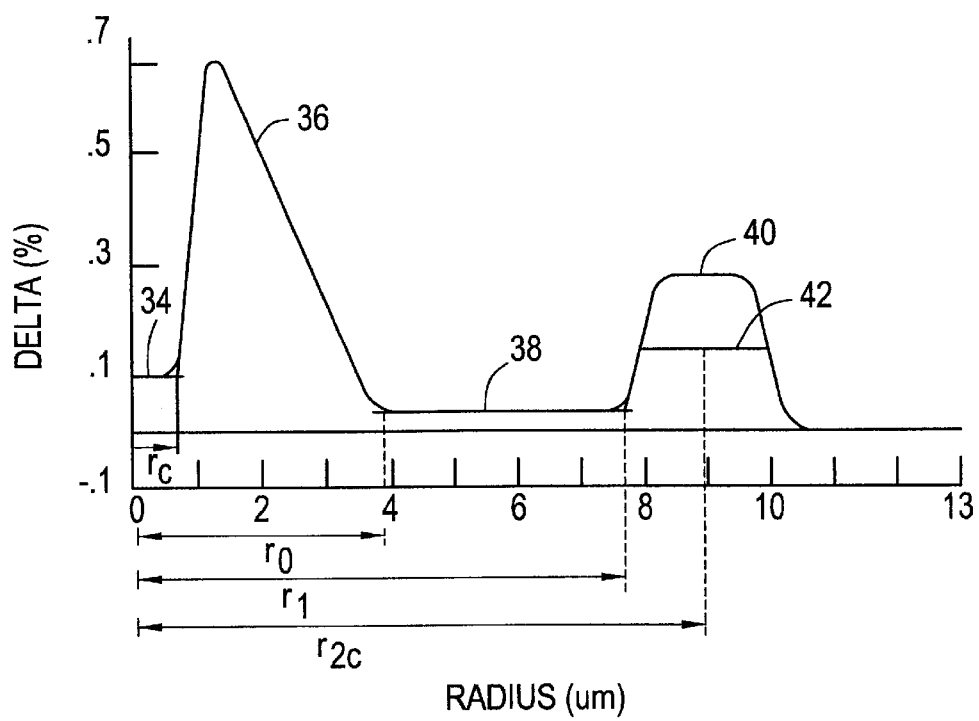
FIG. 3 is a chart of relative refractive index versus radius for a waveguide fiber in accordance with the invention.

A waveguide fiber in accordance with FIG. 3 was modeled using the parameters, central segment relative index 36, $\Delta_0\%=0.65\%$, central segment outer radius $r_0=4.0$ $\mu m$, first annular segment index 4, $\Delta_1\%=0.025\%$, first annular segment radius $r_1=7.8$ $\mu m$, and second annular segment index 6, $\Delta_2\%=0.275\%$, center radius $r_{2c}=9$ $\mu m$, and width $w_2=2.0$ $\mu m$. The centerline relative index 34 was chosen to be 0.1% and as having a minimum width $r_c$ of 0.8 $\mu m$. An index depression of this type is not difficult to manufacture and does have a beneficial effect on the propagated light power distribution across the core region of the waveguide. That is, the depressed index on centerline in the form of a step or a trapezoid provides a waveguide fiber having improved bending resistance.

The calculated properties of the exemplary waveguide fiber were, zero dispersion wavelength 1460.4 $\mu m$, total dispersion at 1525 nm, 4.49 ps/nm-km, total dispersion at 1575 nm, 7.96 ps/nm-km, total dispersion at 1625 nm, 11.44 ps/nm-km, total dispersion slope over the wavelength range 1525 nm to 1625 nm, 0.0695 ps/nm$^2$-km, fiber cut off wavelength 1911 nm in correspondence with a calculated cabled cut off of 1250 nm, mode filed diameter at 1600, 10.1 $\mu m$, pin array bend loss at 1600 nm, 9.41 dB, lateral load bend loss at 1600 nm, 0.585 dB/km, effective area at 1600 nm, 79.4 $\mu m^2$, and attenuation at 1600 nm, 0.21 dB/km.

Here again the properties are well within desired parameters for L band operation and the manufacturing process is essential equivalent to that for the profile illustrated in FIG. 1.

EXAMPLE 4

Figure 4:
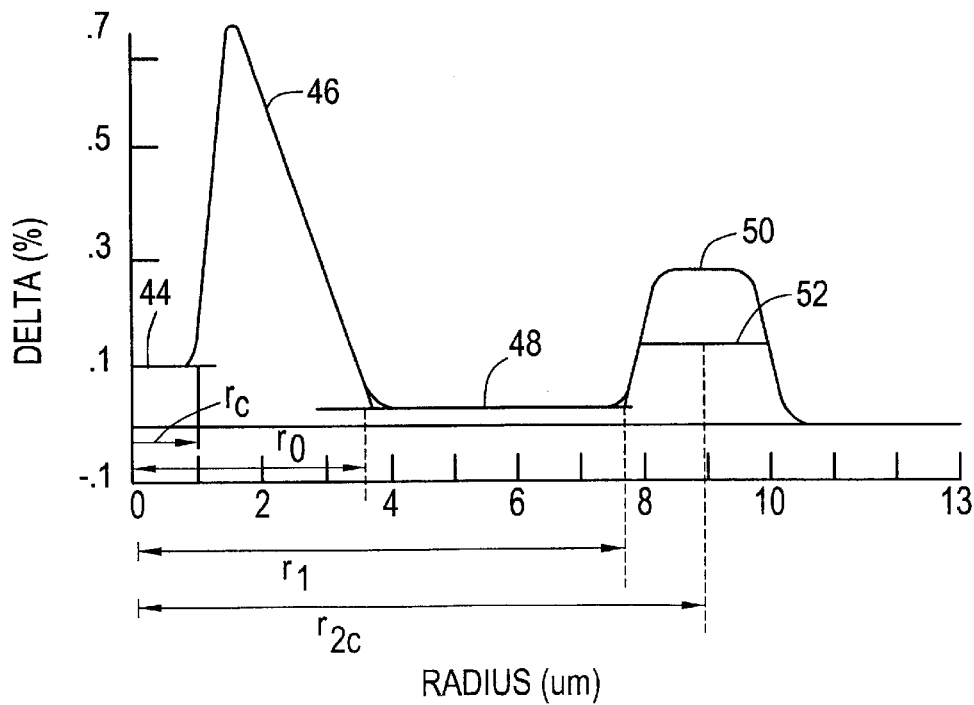
FIG. 4 is a chart of relative refractive index versus radius for a waveguide fiber in accordance with the invention.

A waveguide fiber in accordance with FIG. 4, a profile that is analogous to that in FIG. 3, was modeled using the parameters, central segment relative index 46, $\Delta_0\%=0.70\%$, central segment outer radius $r_0 3.6$ $\mu m$, first annular segment index 48, $\Delta_1\%=0.024\%$, first annular segment radius $r_1=7.78$ $\mu m$, and second annular segment index 50, $\Delta_2\%=0.28\%$, center radius $r_{2c}=9$ $\mu m$, and width 52, $w_2=2.06$ $\mu m$. The centerline relative index 44 was chosen to be 0.1% and as having a minimum width $r_c$ of 0.89 $\mu m$. An index depression of this type is not difficult to manufacture and does have a beneficial effect on the propagated light power distribution across the core region of the waveguide. That is, the depressed index on centerline in the form of a step or a trapezoid provides a waveguide fiber having improved bending resistance.

The calculated properties of the exemplary waveguide fiber were, zero dispersion wavelength 1455.1 $\mu m$, total dispersion at 1525 nm, 4.81 ps/nm-km, total dispersion at 1575 nm, 8.26 ps/nm-km, total dispersion at 1625 nm, 11.7 ps/nm-km, total dispersion slope over the wavelength range 1525 nm to 1625 nm, 0.069 ps/nm$^2$-km, fiber cut off wavelength 1913 nm in correspondence with a calculated cabled cut off of 1251 nm, mode filed diameter at 1600, 10.1 $\mu m$, pin array bend loss at 1600 nm, 8.69 dB, lateral load bend loss at 1600 nm, 0.563 dB/km, effective area at 1550 nm, 80.2 m$^2$, and attenuation at 1550 nm, 0.214 dB/km.

A broadening of the centerline radius $r_c$ results in improved bending resistance and larger effective area in comparison to the index profile illustrated in FIG. 3.

EXAMPLE 5

Figure 5:
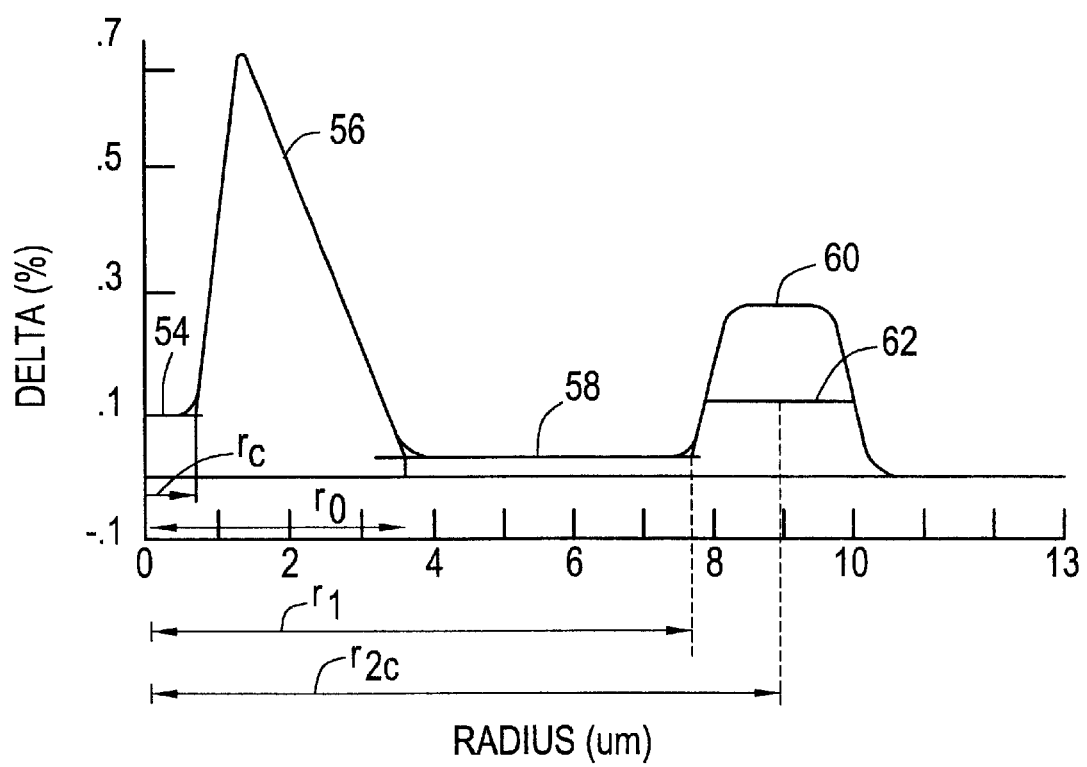
FIG. 5 is a chart of relative refractive index versus radius for a waveguide fiber in accordance with the invention.

A waveguide fiber index profile illustrated in FIG. 5, a profile that is analogous to those illustrated in FIGS. 3 and 4, was modeled using the parameters, central segment relative index 56, $\Delta_0\%=0.68\%$, central segment outer radius $r_0=3.56$ $\mu m$, first annular segment index 48, $\Delta_1\%=0.048\%$, first annular segment radius $r_1=7.72$ $\mu m$, and second annular segment index 50, $\Delta_2\%=0.27\%$, center radius $r_{2c}=9$ $\mu m$, and width 52, $w_2$=2.0 μm. The centerline relative index 44 was chosen to be 0.1% and as having a minimum width $r_c$ of 0.67 μm. In this example, the centerline depression was narrowed, limiting its impact on the light power distribution, but the relative index of the first annular segment was increased. This combination of parameters provides an improvement in pin array bend loss and no appreciable change in lateral load bend loss in comparison to the index profiles illustrated in FIGS. 3 and 4.

The calculated properties of the exemplary waveguide fiber were, zero dispersion wavelength 1460.4 μm, total dispersion at 1525 nm, 4.64 ps/nm-km, total dispersion at 1575 nm, 8.26 ps/nm-km, total dispersion at 1625 nm, 11.84 ps/nm-km, total dispersion slope over the wavelength range 1525 nm to 1625 nm, 0.072 ps/nm$^2$-km, fiber cut off wavelength 1964 nm in correspondence with a calculated cabled cut off of 1281 nm, mode filed diameter at 1600, 10.2 μm, pin array bend loss at 1600 nm, 6.58 dB, lateral load bend loss at 1600 nm, 0.627 dB/km, effective area at 1550 nm, 80.2 μm$^2$, and attenuation at 1550 nm, 0.21 dB/km.

These embodiments of the invention provide an optical waveguide fiber suitable for use in long haul telecommunications systems that use an extended operating wavelength window. Total dispersion over the extended window is in the range 4 ps/nm-km to 13 ps/nm-km and effective area is typically 80 μm$^2$, with higher effective area, greater than 90 μm$^2$, possible if a negative relative index annular segment is included in the core. Wavelength division multiplexed operation at 10 Gb/s using only terminal dispersion compensation is enabled by the invention.

EXAMPLE 6

Figure 6:
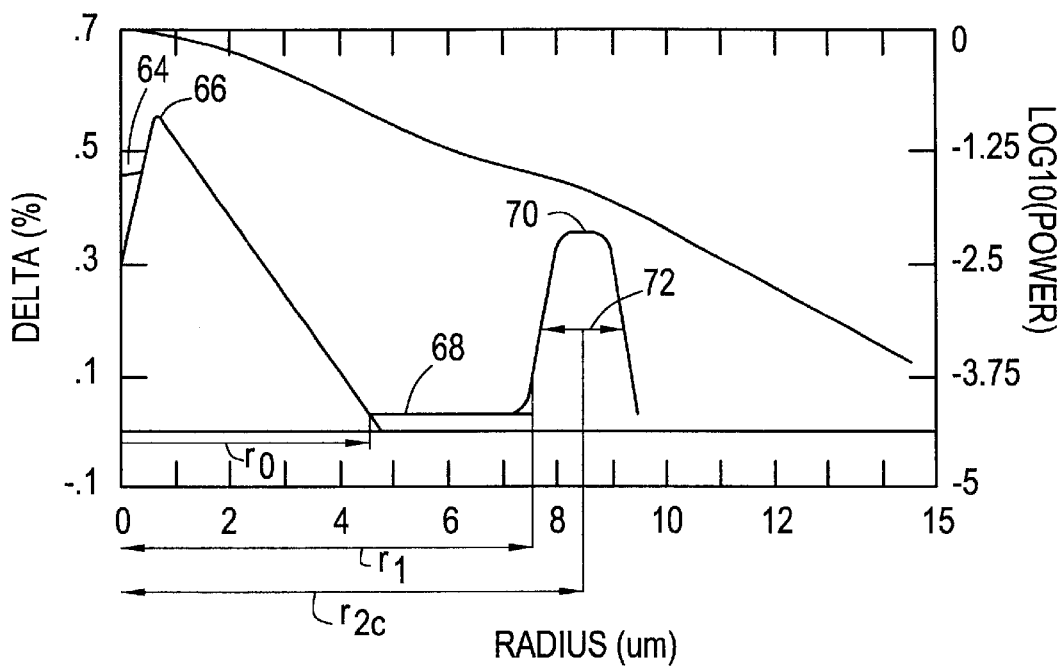
FIG. 6 is a chart of relative refractive index versus radius for a waveguide fiber in accordance with the invention.

A waveguide fiber in accordance with FIG. 6 was modeled using the parameters, central segment relative index 66, $\Delta_0$%=0.61%, central segment outer radius $r_0$=4.55 μm, first annular segment index 68, $\Delta_1$%=0.03%, first annular segment radius $r_1$=7.4 μm, and second annular segment index 70, $\Delta_2$%=0.35%, center radius $r_{2c}$=8.5 μm, and width 72=1.50 μm. The centerline relative index was taken to be 0.3% minimum and as having a half width 64 of 0.4 μm. An index depression of this small radius does not have appreciable effect on the propagated light power distribution across the core region of the waveguide and can readily be compensated by a small change in relative index of the central segment. By half width is meant the distance from the centerline to the point at which the centerline profile delta is half the difference between the maximum and minimum relative index of the centerline profile portion. This definition is used consistently throughout the specification.

The calculated properties of the exemplary waveguide fiber were, zero dispersion wavelength 1434.6 μm, total dispersion at 1525 nm, 6.77 ps/nm-km, total dispersion at 1575 nm, 10.51 ps/nm-km, total dispersion slope over the wavelength range 1525 nm to 1575 nm, 0.0748 ps/nm$^2$-km, mode filed diameter at 1550, 10.61 μm, fiber cut off wavelength, 1999 nm, corresponding to a cabled cut off calculated to be 1271 nm, pin array bend loss at 1550 nm, 8.26 dB, lateral load bend loss at 1550 nm, 0.82 dB/km, effective area at 1550 nm, 85.17 m$^2$, and attenuation at 1550 nm, 0.194 dB/km.

Waveguide fiber properties over the S and L band ranges are comparable to those shown in the examples above.

The effective area and mode field diameter are high while macro-bend attenuation is remarkably low. The fiber shows only a small increase in micro-bend attenuation.

Comparative Example 7

A waveguide fiber in accordance with FIG. 6 was modeled using the parameters, central segment relative index 66, $\Delta_0$%=0.56%, central segment outer radius $r_0$=5.0 μm, first annular segment index 68, $\Delta_1$%=0.03%, first annular segment radius $r_1$=7.2 μm, and second annular segment index 70, $\Delta_2$%=0.35%, center radius $r_{2c}$=8 μm, and width 72=1.5 μm. The centerline relative index was taken to be 0.3% minimum and as having a half width 64 of 0.4 μm. An index depression of this small radius does not have appreciable effect on the propagated light power distribution across the core region of the waveguide and can readily be compensated by a small change in relative index of the central segment.

The calculated properties of the exemplary waveguide fiber were, zero dispersion wavelength 1391.4 μm, total dispersion at 1525 nm, 10.07 ps/nm-km, total dispersion at 1575 nm, 13.84 ps/nm-km, total dispersion slope over the wavelength range 1525 nm to 1575 nm, 0.0745 ps/nm$^2$-km, mode filed diameter at 1550, 11.29 μm, fiber cut off wavelength, 1963 nm, corresponding to a cabled cut off calculated to be 1297 nm, pin array bend loss at 1550 nm, 7.51 dB, lateral load bend loss at 1550 nm, 1.286 dB/km, effective area at 1550 nm, 96.57 μm, and attenuation at 1550 nm, 0.193 dB/km.

A small decrease in $\Delta_0$ and an increase in $r_0$ serve to increase effective area as compared to example 7 while maintaining macro-bend resistance low and allowing only a small increase in micro-bend sensitivity.

EXAMPLE 8

A waveguide fiber in accordance with FIG. 6 was modeled using the parameters, central segment relative index 66, $\Delta_0$%=0.625%, central segment outer radius $r_0$=4.6 μm, first annular segment index 68, $\Delta_1$%=0.03%, first annular segment radius $r_1$=6.1 μm, and second annular segment index 70, $\Delta_2$%=0.30%, center radius $r_2$=7 μm, and width 72, 1.8 μm. The centerline relative index was taken to be 0.3% minimum and as having a half width 64 of 0.4 μm. An index depression of this small radius does not have appreciable effect on the propagated light power distribution across the core region of the waveguide and can readily be compensated by a small change in relative index of the central segment.

The calculated properties of the exemplary waveguide fiber were, zero dispersion wavelength 1399.2 μm, total dispersion at 1525 nm, 9.67 ps/nm-km, total dispersion at 1575 nm, 13.51 ps/nm-km, total dispersion slope over the wavelength range 1525 nm to 1575 nm, 0.0769 ps/nm$^2$-km, mode filed diameter at 1550, 10.73 μm, fiber cut off wavelength, 1727 nm, corresponding to a cabled cut off calculated to be 1324 nm, pin array bend loss at 1550 nm, 3.48 dB, lateral load bend loss at 1550 nm, 0.812 dB/km, effective area at 1550 nm, 86.76 m$^2$, and attenuation at 1550 nm, 0.194 dB/km.

This design provides for large effective area and excellent macro-bend resistance, while maintaining good control of micro-bending loss.

EXAMPLE 9

Figure 7:
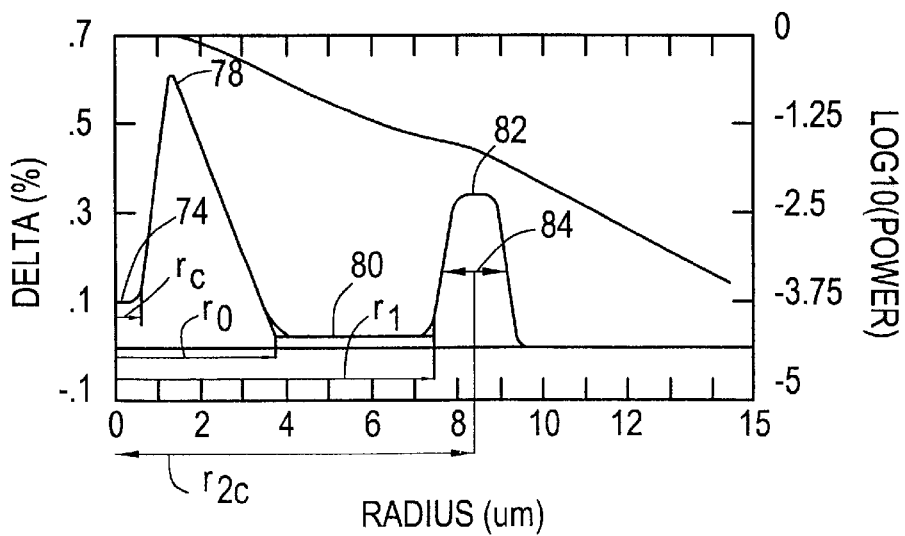
FIG. 7 is a chart of relative refractive index versus radius for a waveguide fiber in accordance with the invention.

A waveguide fiber in accordance with FIG. 7 was modeled using the parameters, central segment relative index 78, $\Delta_0$%=0.71%, central segment outer radius $r_0$=3.9 μm, first annular segment index 80, $\Delta_1$%=0.03%, first annular segment radius $r_1$7.5 μm, and second annular segment index 82, $\Delta_2\%=0.35\%$, center radius $r_{2c}=8.5$ μm, and width 84=1.5 μm. The centerline relative index 74 was chosen to be 0.1% and as having a minimum width $r_c$ of 1.0 μm. An index depression of this type is not difficult to manufacture and does have a beneficial effect on the propagated light power distribution across the core region of the waveguide. That is, the depressed index on centerline in the form of a step or a trapezoid provides a waveguide fiber having improved bending resistance.

The calculated properties of the exemplary waveguide fiber were, zero dispersion wavelength 1435.2 μm, total dispersion at 1525 nm, 6.76 ps/nm-km, total dispersion at 1575 nm, 10.52 ps/nm-km, total dispersion slope over the wavelength range 1525 nm to 1575 nm, 0.0752 ps/nm²-km, fiber cut off wavelength 1857 nm in correspondence with a calculated cabled cut off of 1264 nm, mode filed diameter at 1550, 10.76 μm, pin array bend loss at 1550 nm, 11.71 dB, lateral load bend loss at 1550 nm, 1.065 dB/km, effective area at 1550 nm, 90.39 μm², and attenuation at 1550 nm, 0.206 dB/km.

This design of refractive index profile of the core serves to meet the desired fiber function over the extended window 1450 nm to 1625 nm.

Comparative Example 10

A waveguide fiber in accordance with FIG. 7 was modeled using the parameters, central segment relative index 78, $\Delta_0\%=0.725\%$, central segment outer radius $r_0=3.94$ μm, first annular segment index 80, $\Delta_1\%=0.03\%$, first annular segment radius $r_1=7.5$ μm, and second annular segment index 82, $\Delta_2\%=0.35\%$, center radius $r_{2c}=8.5$ μm, and width 84=1.5 μm. The centerline relative index 74 was chosen to be 0.1% and as having a minimum width $r_c$ of 1.0 μm. An index depression of this type is not difficult to manufacture and does have a beneficial effect on the propagated light power distribution across the core region of the waveguide. That is, the depressed index on centerline in the form of a step or a trapezoid provides a waveguide fiber having improved bending resistance.

The calculated properties of the exemplary waveguide fiber were, zero dispersion wavelength 1433.2 μm, total dispersion at 1525 nm, 6.65 ps/nm-km, total dispersion at 1575 nm, 10.27 ps/nm-km, total dispersion slope over the wavelength range 1525 nm to 1575 nm, 0.0725 ps/nm²-km, fiber cut off wavelength 1860 nm in correspondence with a calculated cabled cut off of 1266 nm, mode filed diameter at 1550, 10.48 μm, pin array bend loss at 1550 nm, 8.46 dB, lateral load bend loss at 1550 nm, 0.767 dB/km, effective area at 1550 nm, 85.46 μm, and attenuation at 1550 nm, 0.207 dB/km.

Calculated parameters in the L band are, dispersion at 1625 nm 14.30 ps/nm-km, dispersion slope at 1625, 0.744 ps/nm²-km, mode field diameter, 11.26 μm, pin array bend loss at 1600 nm, 13.91 dB, lateral load bend loss at 1600 nm, 1.55 dB/km, effective area at 1600, 96.8 μm², and attenuation at 1600 nm, 0.198 dB/km.

The increase in $\Delta_0\%$ and $r_0$ serve to improve bend resistance in comparison with the profile of example 9 while maintaining comparable effective area, mode field diameter, and attenuation. The L band values show the extended performance window of this waveguide fiber design.

These embodiments of the invention provide an optical waveguide fiber suitable for use in long haul telecommunications systems that use an extended operating wavelength window. Total dispersion over the extended window is in the range 0 ps/nm-km to 15 ps/nm-km and effective area is typically 80 μm², with higher effective area, greater than 90 μm², possible without recourse to a negative relative index segment. This factor is important in terms of manufacturing costs. Wavelength division multiplexed operation at 10 Gb/s using only terminal dispersion compensation is enabled by the invention.

It will be apparent to those skilled in the art that various modifications and variations of the present invention can be made without departing from the spirit and scope of the invention. Thus, it is intended that the present invention include the modifications and variations of this invention provided they come within the scope of the appended claims and their equivalents.

What is claimed is:

1. A single mode optical waveguide fiber comprising:
   a core region surrounded by and in contact with a clad layer, wherein the core region and the clad layer each have respective refractive index profiles and are configured to guide light through the waveguide fiber; wherein,
   said core region includes a central segment, a first annular segment surrounding the central segment, and a second annular segment surrounding the first annular segment; and wherein,
   each said segment has a respective index profile, inner and outer radius, and relative index greater than zero selected to provide a waveguide fiber having an effective area at 1550 nm greater than 80 μm², a zero dispersion wavelength less than about 1450 nm and a total dispersion at 1525 nm less than or equal to about 11 ps/nm-km.

2. The single mode waveguide of claim 1 wherein the attenuation at 1550 nm is less than 0.25 dB/km.

3. The single mode waveguide of claim 1 wherein the pin array bend loss is less than 12 dB at 1550 nm and less than 16 dB at 1600 nm.

4. The single mode waveguide of claim 1 wherein the lateral load bend loss at 1550 nm is less than 1.0 dB/km.

5. The single mode waveguide of claim 1 wherein the effective area at 1600 nm is greater than 70 μm² and the attenuation at 1600 nm is less than 0.25 dB/km.

6. The single mode waveguide of claim 1 wherein,
   said central segment has relative index percent, $\Delta_0$, $0.50\% \leq \Delta_0 \leq 1.0\%$, inner radius zero, and outer radius $r_0$, $3.5$ μm $\leq r_0 \leq 5.0$ μm,
   said first annular segment has relative index percent, $\Delta_1$, $0.01\% \leq \Delta_1 \leq 0.1\%$, and outer radius $r_1$, $5.5$ μm $\leq r_1 \leq 10$ μm,
   said second annular segment has relative index percent, $\Delta_2$, $0.15\% \leq \Delta_2 \leq 0.35\%$, center radius $r_{2c}$, $7.0$ μm $\leq r_{2c} \leq 11.0$ μm, and width $w_2$, $0.8$ μm $\leq w_2 \leq 2.5$ μm.

7. The single mode waveguide of claim 1 wherein said central segment has a centerline and further includes a relative index depression on the centerline and wherein said index depression has a minimum relative index greater than or equal to zero and a radius, measured at said minimum relative index outwardly from the centerline, less than or equal to 1 μm.

8. The single mode fiber of claim 7 wherein said central segment has relative index percent, $\Delta_0$, $0.50\% \leq \Delta_0 \leq 1.0\%$, outer radius $r_0$, $3.0$ μm $\leq r_0 \leq 5.0$ μm, said first annular segment has relative index percent, $\Delta_1$, $0.01\% \leq \Delta_1 \leq 0.10\%$, outer radius $r_1$, $6.0$ μm $\leq r_0 \leq 9.0$ μm, said second annular segment has relative index percent, $\Delta_2$, $0.15\% \leq \Delta_2 \leq 0.5\%$, center radius $r_{2c}$, $7.0$ μm $\leq r_{2c} \leq 11.0$ μm, and width $w_2$, $1.0$ μm $\leq w_2 \leq 3.0$ μm.

9. The single mode waveguide fiber of claim 1 further including a third annular region surrounding said second annular region having a negative relative index.

10. The single mode waveguide of claim 9 wherein the attenuation is less than 0.20 dB/km.

11. The single mode waveguide of claim 9 wherein the pin array bend loss is less than 5 dB at 1550 nm and less than 8 dB at 1600 nm.

12. The single mode waveguide of claim 9 wherein the lateral load bend loss at 1550 nm is less than 1.38 dB/km and at 1600 nm is less than 2.55 dB/km.

13. The single mode waveguide of claim 9 wherein the effective area at 1600 nm is greater than 90 $\mu m^2$ and the attenuation at 1600 nm is less than 0.25 dB/km.

14. The single mode waveguide fiber of claim 9 wherein said third annular segment has a relative index $\Delta_3$, $-0.15\% \leq \Delta_3 \leq -0.45\%$, center radius $r_{3c}$, $12.0 \mu m \leq r_{3c} \leq 17.0 \mu m$, and width $w_3$, $2.5 \mu m \leq w_3 \leq 5.0 \mu m$.

15. The single mode waveguide fiber of claim 9 wherein said central segment has relative index percent, $\Delta_0$, $0.50\% \leq \Delta_0 \leq 1.0\%$, outer radius $r_0$, $4.0 \mu m \leq r_0 \leq 6.0 \mu m$, said first annular segment has relative index percent, $\Delta_1$, $0.01\% \leq \Delta_1 \leq 0.10\%$, outer radius $r_1$, $7.5 \mu m \leq r_1 \leq 11 \mu m$, said second annular segment has relative index percent, $\Delta_2$, $0.35\% \leq \Delta_2 \leq 0.60\%$, and radius $r_2$, $10 \mu m \leq r_2 \leq 15 \mu m$.

16. The single mode waveguide of claim 1 wherein the attenuation at 1550 nm is less than 0.25 dB/km.

17. A single mode optical waveguide fiber comprising:

a core region surrounded by and in contact with a clad layer, wherein the core region and the clad layer each have respective refractive index profiles and are configured to guide light through the waveguide fiber;

wherein said core region includes a central segment, a first annular segment surrounding the central segment, and a second annular segment surrounding the first annular segment;

wherein said central segment has relative index percent, $\Delta_0$, $0.50\% \leq \Delta_0 \leq 1.0\%$, inner radius zero, and outer radius $r_0$, $3.5 \mu m \leq r_0 \leq 5.0 \mu m$, said first annular segment has relative index percent, $\Delta_1$, $0.01\% \leq \Delta_1 \leq 0.1\%$, and outer radius $r_1$, $5.5 \mu m \leq r_1 \leq 10 \mu m$, said second annular segment has relative index percent, $\Delta_2$, $0.15\% \leq \Delta_2 \leq 0.35\%$, center radius $r_{2c}$, $7.0 \mu m \leq r_{2c} \leq 11.0 \mu m$, and width $w_2$, $0.8 \mu m \leq w_2 \leq 2.5 \mu m$; and wherein, each said segment has a respective index profile, inner and outer radius, and relative index greater than zero selected to provide a waveguide fiber having a zero dispersion wavelength less than about 1450 nm and a total dispersion at 1525 nm less than or equal to about 11 ps/nm-km.

18. A single mode optical waveguide fiber comprising:

a core region surrounded by and in contact with a clad layer, wherein the core region and the clad layer each have respective refractive index profiles and are configured to guide light through the waveguide fiber; wherein, said core region includes a central segment, a first annular segment surrounding the central segment, and a second annular segment surrounding the first annular segment; and wherein, each said segment has a respective index profile, inner and outer radius, and relative index greater than zero selected to provide a waveguide fiber having an attenuation at 1550 nm less than 0.20 dB/km, an effective area at 1550 nm greater than 80 $\mu m^2$, a zero dispersion wavelength less than about 1450 nm, and a total dispersion at 1525 nm less than or equal to about 11 ps/nm-km.

* * * * *